Feb. 23, 1965 R. G. MARTIN 3,171,112
FAULT INDICATOR CIRCUIT FOR POWER SUPPLY SYSTEM
Filed Feb. 19, 1962
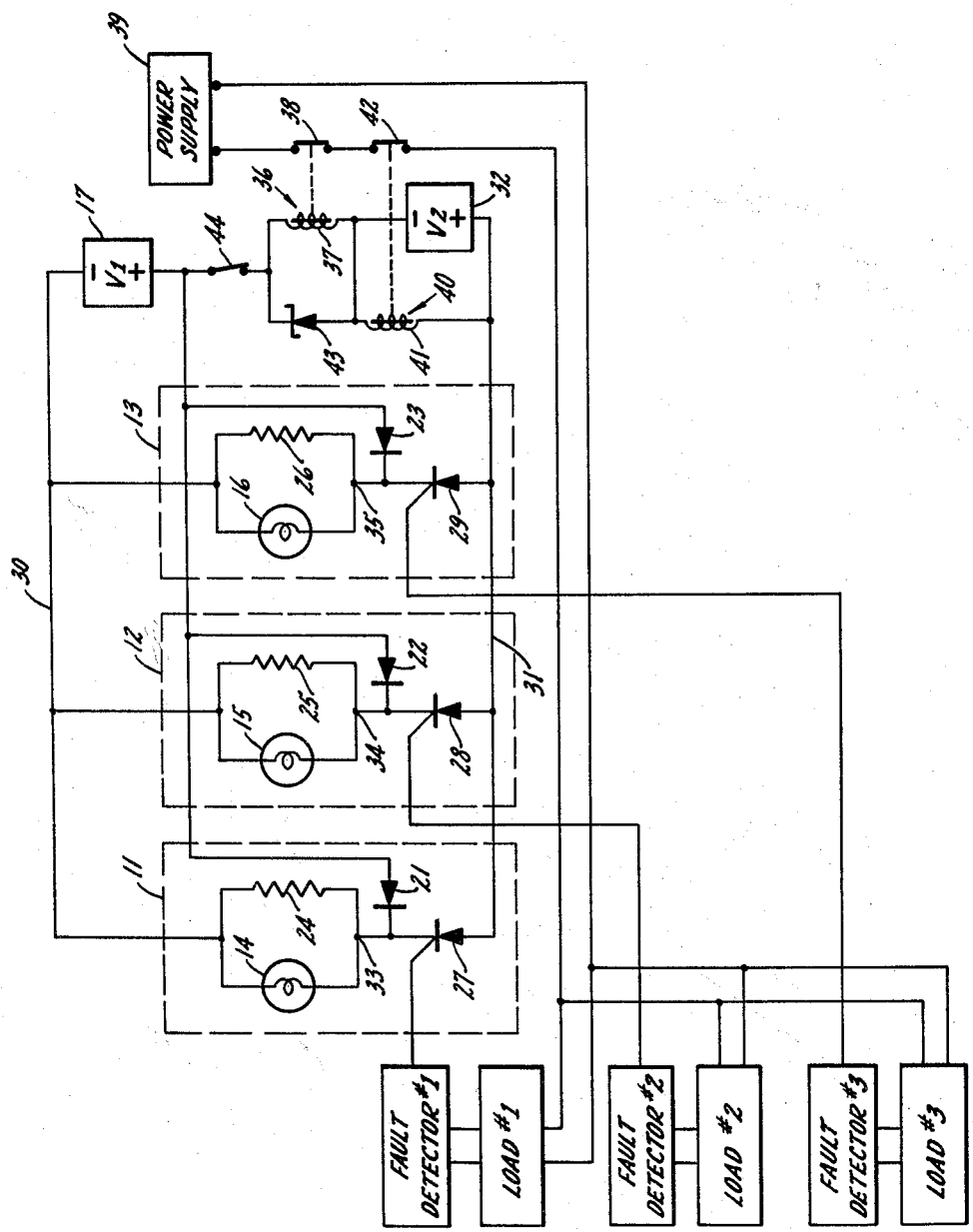
INVENTOR.
Raymond G. Martin,
BY
Attorneys.

# United States Patent Office 3,171,112
Patented Feb. 23, 1965

3,171,112
FAULT INDICATOR CIRCUIT FOR POWER SUPPLY SYSTEM
Raymond G. Martin, Baltimore, Md., assignor, by mesne assignments, to the United States of America as represented by the Secretary of the Navy
Filed Feb. 19, 1962, Ser. No. 174,324
2 Claims. (Cl. 340—253)

The present invention relates to a fault indicator circuit for a power supply system and more particularly to a protection circuit and a fault indicator circuit for use where a number of identical loads are fed from a single power supply.

Various systems have been used in the past to shut off a power supply and indicate the source of trouble in a multiple load unit. The most common systems use a plurality of relays that are connected one each to the loads, and upon failure of the load, the relay is actuated and closes a circuit that energizes a light. Relays are, however, relatively expensive, and when used in large numbers, occupy a considerable amount of space which is often at a premium, particularly in airborne equipment. Also, there is a large number of hookup wires required with relays, which further increases the size and weight of the unit.

In the present invention, a plurality of indicator lamps are provided, one each for each load, such as a traveling wave tube. Under normal conditions, each of the indicator lamps is energized from a direct current source through an individual semiconductor diode which provides a dim indication of each lamp. In the event of an abnormal condition at one of the loads, a fault detector, such as a current transformer connected in series with the load, will produce an output pulse which will trigger a silicon controller rectifier into a conducting condition. An additional direct current, which is supplied by a second source, will then flow through the indicator lamp and provide a bright fault indication. At the same time, the current will operate a current sensitive relay, and a contact on this relay will then be used to de-energize the power supply feeding the fault. The indicator lamp will, however, remain energized to show the particular load circuit that has failed.

It is therefore a general object of the present invention to provide an improved protection and fault indicating device where a number of identical loads are fed from a single power supply.

Another object of the present invention is to provide a common fault detection circuit at the power supply to give reliable operation and indications with a minimum number of interconnecting wires between the loads and the power supply.

Still another object of the present invention is to provide a dim light indication for a normal condition and a bright light indication for an abnormal condition.

Other objects and advantages of the present invention will be readily appreciated as the same becomes better understood by reference to the following detailed description when considered in connection with the accompanying drawing wherein the figure is a schematic circuit diagram showing the fault indicator circuit.

Referring now to the drawing, there is shown, for purposes of illustration, three indicating devices 11, 12, and 13. In actual operation there may be many more indicating devices, as for example, in one radar application where a hundred traveling wave tubes were employed, an indicating device was provided for each traveling wave tube. Lamps 14, 15, and 16 are energized from the direct current source 17 through semiconductor diodes 21, 22, and 23, respectively. Resistors 24, 25, and 26 are connected in shunt with lamps 14, 15, and 16, respectively, the function of which will be described later.

Silicon controlled rectifiers 27, 28, and 29 are provided in indicating devices 11, 12, and 13, respectively. A silicon controlled rectifier is a three-junction semiconductor device which will block positive anode to cathode voltage as does a thyratron. However, when a signal is applied to the third or gate lead of a silicon controlled rectifier, the device rapidly switches to a conducting state and provides the low forward voltage drop of a typical medium power silicon rectifier. Once the gate has fired the device, it no longer has control and the device continues to conduct until the anode voltage is either reversed or removed. As shown in the drawing, the anodes of the silicon controlled rectifiers are connected through lead 31 to a direct current source 32, and the cathodes are connected to junction points 33, 34, and 35, which are common to the lamps and resistors of the indicating devices 11, 12, and 13, respectively. The gate lead of each silicon controlled rectifier is connected to a separate fault detector at each load, such as a current transformer in series with the load.

Relay 36 has a coil 37 connected between the two current sources 17 and 32 and when current is flowing through coil 37 a set of contacts 38 is opened and the power supply 39 is disconnected from the loads. A second relay coil 41 is shunted across the current source 32 for the purpose of proving the presence of the direct current source 32. A failure of source 32 will cause contacts 42 to be opened and thus shut down the power supply 39. Zener diode 43 is provided across relay coil 37 for the purpose of preventing damage to the coil in case of a multiple fault by shunting current through Zener diode 43. Resistors 24, 25, and 26 are shunted across lamps 14, 15, and 16, respectively, so that in the event of a lamp failure, relay 36 can still be energized if there is a fault in a load. The function of the diodes 21, 22, and 23 is to isolate the indicator circuits to prevent the triggering of one silicon controlled rectifier from producing fault indications at each load.

In operation, assuming that loads 1, 2, and 3 are operating in a normal condition, current from source 17 will illuminate lamps 14, 15, and 16 in a dim condition. No current will be provided the lamps from source 32 and contacts 38 will be closed. Assume now an abnormal condition arises in load number 1, the fault detector 1 will apply a signal to the gate lead of silicon controlled rectifier 27 and silicon controlled rectifier 27 will rapidly switch to a conducting state, and current will flow from source 32 through silicon controlled rectifier 27 and lamp 14 to provide a bright condition for lamp 14. Also, the current from source 32 will flow through relay coil 37 which in turn, opens contacts 38 and thus shuts off power supply 39 from the loads. Current will, however, continue to flow through silicon controlled rectifier 27 and lamp 14 to indicate which load had developed the abnormal condition.

Assuming now that the abnormal condition has been corrected, the momentary opening of normally closed switch 44 will shut off the flow of current through silicon controlled rectifier 27 and relay 36 and contacts 38 will then close and the power supply 39 will be again connected to the loads. Silicon controlled rectifier 27 will again block positive anode to cathode voltage and lamp 14 will again be in a dim condition.

In the event of failure of the direct current source 32, the current flowing through coil 41 of relay 40 will stop and contacts 42 will be opened to disconnect power supply 39 from the loads. In case of multiple failure of loads, a multiple number of lamps, equal to the number of faults, will become bright, and these lamps will be connected in parallel between leads 30 and 31. Thus there will be an increase of current flowing between sources 17 and 32 and part of the current will be shunted through Zener diode 43.

It can thus be seen that the present invention provides a dim lamp indication for a normal load condition and a bright lamp indication for an abnormal condition. Also, when a bright lamp condition exists, the power supply that supplies the load is disconnected from the load in order to protect the remainder of the loads.

Obviously many modifications and variations of the present invention are possible in the light of the above teachings. It is therefore to be understood, that within the scope of the appended claims, the invention may be practiced otherwise than as specifically described.

What is claimed is:

1. A protective circuit for interrupting the voltage supplied to a plurality of circuits during an abnormal condition and for indicating the particular circuit in which the abnormality occurred comprising:
   (a) plurality of circuits to be protected,
   (b) a power supply connected to said plurality of circuits to be protected,
   (c) a first source of direct current voltage,
   (d) a plurality of indicating lamps one each for each circuit to be protected, said lamps being connected in parallel across said first source of direct current voltage,
   (e) a second source of direct current voltage,
   (f) a plurality of silicon controlled rectifiers each having an anode, a cathode, and a gate electrode, each said anode being connected to said second source of direct current voltage and said cathodes being connected one each to each said indicating lamps,
   (g) a plurality of signal means connected one each between each gate electrode and each circuit to be protected whereby an abnormal condition in a particular circuit of a plurality of circuits causes a signal to be applied to the gate electrode connected to said particular circuit having an abnormal condition thereby permitting current flow from said second source of direct current voltage through said indicating lamp which is connected to the cathode of the silicon controlled rectifier whose gate electrode received the applied signal, and
   (h) means disconnecting said power supply from said plurality of circuits to be protected upon the occurrence of an abnormal condition in said plurality of circuits to be protected.

2. A protective circuit for interrupting the voltage supplied to a plurality of circuits during an abnormal condition and for indicating the particular circuit in which the abnormality occurred as set forth in claim 1 wherein said means disconnecting said power supply from said plurality of circuits to be protected upon the occurrence of an abnormal condition comprises a relay having a coil and having when energized a set of normally opened contacts, said coil being connected between said first and second sources of direct current voltages and said contacts being connected between said power supply and said plurality of circuits to be protected.

References Cited by the Examiner

UNITED STATES PATENTS

| | | | |
|---|---|---|---|
| 1,796,919 | 3/31 | Brogger | 340—244 |
| 2,719,966 | 10/55 | Schurr | 340—253 |
| 2,736,009 | 2/56 | Barnickel | 340—213 |
| 2,769,970 | 11/56 | Kratville | 340—213 |
| 2,957,107 | 10/60 | Fegely | 315—135 XR |
| 3,084,338 | 4/63 | Mauer et al. | 307—88.5 |

NEIL C. READ, *Primary Examiner.*